Figures 1, 2:
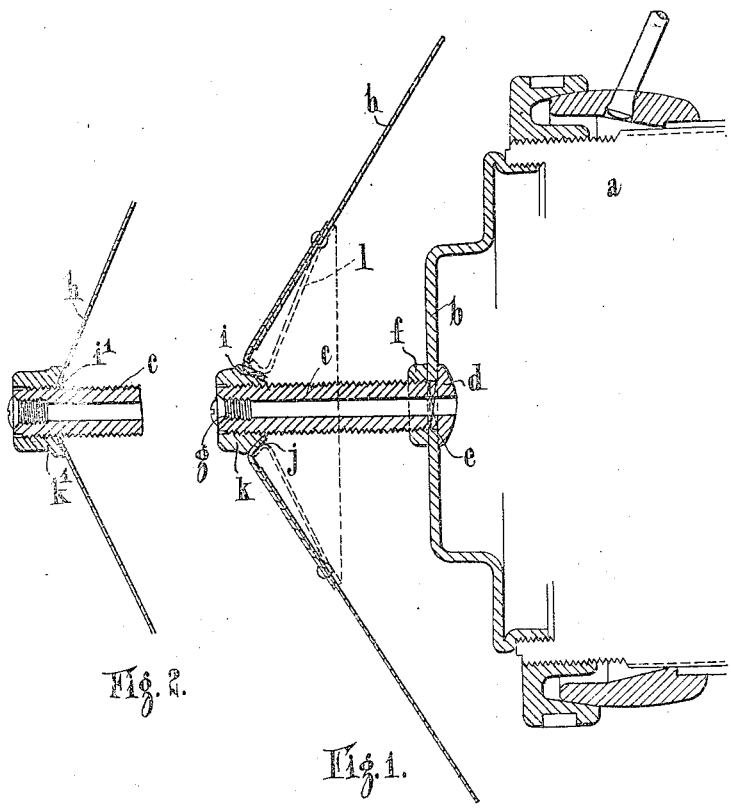

J. V. PUGH.
VEHICLE WHEEL COVERING DISK AND METHOD OF ATTACHING SAME.
APPLICATION FILED NOV. 27, 1916.

1,289,908.

Patented Dec. 31, 1918.

Inventor:

John V. Pugh,

Spear, Middleton, Donaldson & Spear
Attorney

UNITED STATES PATENT OFFICE.

JOHN VERNON PUGH, OF ALLESLEY, ENGLAND, ASSIGNOR TO RUDGE-WHITWORTH LIMITED, OF COVENTRY, ENGLAND.

VEHICLE-WHEEL-COVERING DISK AND METHOD OF ATTACHING SAME.

1,289,908.    Specification of Letters Patent.    Patented Dec. 31, 1918.

Application filed November 27, 1916. Serial No. 133,760.

*To all whom it may concern:*

Be it known that I, JOHN VERNON PUGH, a subject of the King of Great Britain and Ireland, residing at Guiting House, Allesley, in the county of Warwick, England, have invented certain new and useful Improvements in Vehicle-Wheel-Covering Disks and Methods of Attaching Same, of which the following is a specification.

This invention relates to vehicle wheels having cover disks for inclosing the spokes and providing substantially smooth surfaces on each side of the wheel.

In some wheels of this type lubrication of the wheel bearings necessitates the removal of the outer disk, while the replacement or attachment of such disk is at times impeded by the difficulty of locating a threaded hole in the hub cap, which receives an attachment screw.

The object of the present invention is to provide improved attachment means which are not subject to the foregoing disadvantages.

The invention consists in an attachment means for a wheel spoke covering disk in which access for lubricating the wheel bearings is obtained without releasing the cover disk by means of a tubular member passing therethrough.

The invention further consists in an attachment means of the foregoing type in which the disk is provided with means adapted to coöperate with a member projecting from the wheel hub to facilitate the rapid and correct positioning of the disk upon the wheel.

The invention further consists in an attachment means for a wheel spoke covering disk comprising a tubular member projecting from the wheel hub and communicating with the interior thereof, said member being provided with an external thread or other means for engaging a nut or the like which retains the disk in position and also being provided with means for retaining lubricant in said hub.

The invention further consists in an attachment means for a wheel spoke covering disk in which the disk is connected by means of a fastening device which projects from the hub through an aperture in the disk and said aperture is provided upon the inner side of the disk with an internal frusto-conical or like surface forming a guide thereto.

The invention also consists in the improvements in attachment means for wheel spoke covering disks as hereinafter described.

Referring now to the accompanying drawings:—

Figure 1 is a fragmental view showing one way in which the invention may be carried into effect, and Fig. 2 shows a modification thereof.

In carrying this invention into effect in the form shown by way of example in Fig. 1, $a$ is the outer end of a detachable wheel hub which is fitted with a grease-cap or cover $b$ of an ordinary type.

Co-axial with the grease-cap $b$ is a tubular member or hollow stud $c$ the bore of which communicates with the interior of the hub. The stud $c$ is screw-threaded upon the greater portion of its length and it is provided with a head $d$ and a squared shoulder $e$ immediately adjoining the head. The shoulder fits a suitable aperture in the grease-cap $b$ and the hollow stud $c$ may be retained rigidly in connection with the grease-cap by means of a nut $f$ engaging the external thread.

The outer end of the bore of the stud is provided with an internal screw thread for the reception of a screw $g$ for closing the tube and preventing the escape of any lubricant from the interior of the hub.

The wheel is provided with spoke covering disks of the type hereinbefore indicated and the outer of these disks $h$ is provided with a central aperture $i$ having a conical seat $j$, the disk being held in position by a nut $k$ screwed upon the thread of the stud $c$ and coöperating with the coned seat $j$. The nut $k$ and seating $j$ may be provided with corrugations to prevent the nut working loose when subject to vibration.

To provide means for rapidly and correctly positioning the disk, a hollow frusto-conical member $l$, as indicated by the dotted lines, may be attached to the inner side of the disk $h$. The member $l$ is formed of two hollow coned frusta facing in opposite directions, the smaller of which coöperates with the back of the central coned seat $j$, while the larger forms a guide to facilitate the rapid positioning of the disk $h$ upon the stud $c$.

In the modification shown in Fig. 2, the central aperture $i'$ of the cover disk $h$ is not provided with an internal conical seat $j$ but the coning of the disk is carried right up to the periphery of the central aperture. The nut $k'$ is formed with an internal conical surface which will coöperate with the surface of the cover disk $h$. By this means a guiding cone for the stud $c$ is formed upon the inner side of the disk without having resource to an additional frusto-conical member, such as the part $l$. In this form of the invention the nut and the surface with which it co-acts may also be provided with corrugations as indicated for preventing the nut when screwed up from working loose.

Modifications in the construction and manner of carrying this invention into effect may be introduced without in any way departing from the spirit of the same.

Having now described my invention what I claim as new and desire to secure by Letters Patent is:—

1. A combined lubricator and spoke covering shield attachment means for a vehicle wheel comprising central screw-threaded liquid retaining elements projecting from said hub through said disk and means for introducing lubricant into the interior of the hub of said wheel through said threaded elements without removing said disk.

2. A combined lubricator and spoke covering shield attachment means for a vehicle wheel comprising a hollow stud projecting from said hub through said disk, a nut screwed upon said stud to retain said disk in position and means for preventing the escape through said stud of lubricant which has been inserted therethrough into said hub.

3. A combined lubricator and spoke covering shield attachment means for a vehicle wheel comprising an internal frusto-conical surface with apex outwardly directed surrounding a central hole in said disk upon the inner side thereof, a hollow stud projecting from said hub through said hole, a nut screwed upon said stud to retain said disk in position and means for preventing the escape through said stud of lubricant which has been inserted therethrough into said hub.

4. A combined lubricator and spoke covering shield attachment means for a vehicle wheel comprising internal frusto-conical surfaces surrounding a central hole in said disk upon the inner and outer sides thereof, a hollow stud projecting from said hub through said hole, a nut having an external frusto-conical surface screwed upon said stud and engaging an internal frusto-conical surface to retain said disk in position, an internal thread formed in the outer end of the passage through said stud and a screw inserted in said thread to prevent the escape from said hub of lubricant inserted therein through said stud.

In testimony whereof I have affixed my signature.

JOHN VERNON PUGH.